(12) United States Patent
Hans

(10) Patent No.: US 7,067,953 B1
(45) Date of Patent: Jun. 27, 2006

(54) STATOR ARRANGEMENT FOR AN ELECTRIC MACHINE

(75) Inventor: Helmut Hans, Sankt Georgen (DE)

(73) Assignee: Minebea Co., Ltd., Nagano-ken (JP)

( * ) Notice: Subject to any disclaimer, the term of this patent is extended or adjusted under 35 U.S.C. 154(b) by 0 days.

(21) Appl. No.: 11/302,141

(22) Filed: Dec. 14, 2005

(30) Foreign Application Priority Data

Jan. 3, 2005 (DE) .................. 10 2005 000 643

(51) Int. Cl.
*H02K 1/14* (2006.01)
*H02K 1/12* (2006.01)
*H02K 1/18* (2006.01)
*H02K 15/02* (2006.01)

(52) U.S. Cl. .................. 310/259; 310/216; 310/218; 310/257; 310/258; 310/254; 29/596

(58) Field of Classification Search ............... 310/259, 310/254, 258, 218, 216, 257; 29/596
See application file for complete search history.

(56) References Cited

U.S. PATENT DOCUMENTS

| | | | |
|---|---|---|---|
| 5,786,651 A | 7/1998 | Suzuki | 310/259 |
| 5,796,195 A | 8/1998 | Miyakawa | 310/68 B |
| 6,049,153 A | 4/2000 | Nishiyama et al. | 310/156.53 |
| 6,359,335 B1 | 3/2002 | Distefano et al. | 257/707 |
| 6,369,483 B1 * | 4/2002 | Hill | 310/216 |
| 6,483,221 B1 | 11/2002 | Pawellek et al. | 310/216 |
| 6,555,942 B1 | 4/2003 | Hsu | 310/208 |
| 6,744,168 B1 * | 6/2004 | Fukuda et al. | 310/215 |
| 6,753,633 B1 * | 6/2004 | Eberle | 310/216 |
| 7,002,280 B1 * | 2/2006 | Endo | 310/263 |
| 2002/0057032 A1 * | 5/2002 | Thiele et al. | 310/216 |
| 2004/0051417 A1 | 3/2004 | Yamazaki et al. | 310/216 |
| 2005/0012425 A1 * | 1/2005 | Tsukamoto et al. | 310/218 |
| 2005/0242677 A1 * | 11/2005 | Akutsu et al. | 310/179 |

FOREIGN PATENT DOCUMENTS

| | | |
|---|---|---|
| DE | 19842948 A1 | 3/2000 |
| DE | 10143870 A1 | 4/2003 |
| EP | 0915553 A3 | 5/1999 |
| EP | 1014536 A3 | 6/2000 |
| JP | 05236682 A * | 9/1993 |
| JP | 2000261998 A * | 9/2000 |
| WO | WO 02/47238 A1 | 6/2002 |
| WO | WO 02/47240 A1 | 6/2002 |

* cited by examiner

*Primary Examiner*—Darren Schuberg
*Assistant Examiner*—Ondria Garner
(74) *Attorney, Agent, or Firm*—Duaune Morris LLP

(57) ABSTRACT

The invention relates to a stator arrangement for an electric machine having a stator ring that is closed at its inside circumference and has stator poles at its outside circumference, wherein the stator ring is built up of a plurality of substantially identical T-shaped segments and wherein each of the T-shaped segments has a main leg having a head and a base and two arms protruding sideways from the head of the main leg, the main legs of the T-shaped segments are aligned in a radial direction and the T-shaped segments are arranged adjacent to each other with alternating orientation of the head and base of the main leg such that they complement one another to form the stator ring.

11 Claims, 2 Drawing Sheets

STATOR ARRANGEMENT FOR AN ELECTRIC MACHINE

FIELD OF THE INVENTION

Figure 1A:
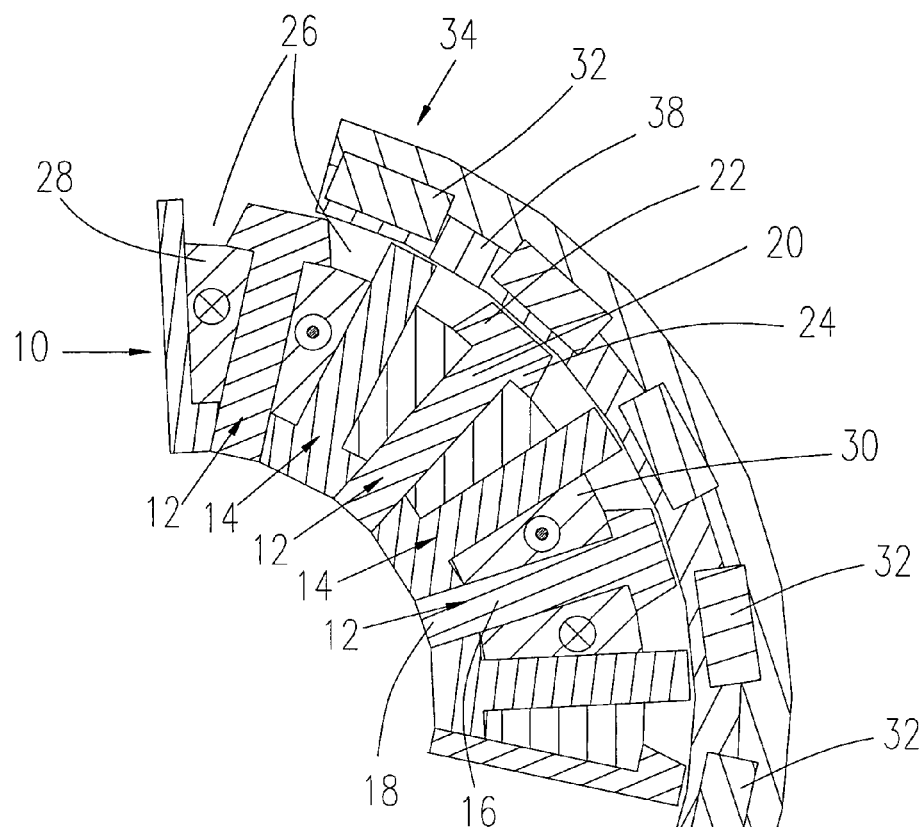

The invention relates to a stator arrangement for an electric machine. A main field of application for the invention is in brushless DC motors and other electric motors, such as permanent magnet motors, that are configured as outer rotor motors. The invention, however, is not limited to this application and can generally be applied to many different kinds of electric motors or generators.

BACKGROUND OF THE INVENTION

Electric motors having an outer rotor configuration have a stator arrangement made up, for example, of a number of stacked stamped metal laminations which form an annular stator back yoke and stator teeth that protrude outwards from the stator back yoke. Phase windings are mounted on the stator teeth. The stator arrangement is inserted coaxially into a rotor arrangement. As a rule, the rotor arrangement comprises a back yoke ring on whose inside circumference one or more magnets are mounted. The magnets may also be embedded in the rotor body.

In the manufacture of stator arrangements for inner or outer rotor motors from stacked stamped metal laminations, there is always a certain amount of material waste, the useful electromagnetic surface being significantly smaller than the surface of the blank. This problem is particularly serious for outer rotor motors having a large diameter because the stator rings generally have a relatively large inside circumference, the inner circle of the respective sheet metal blank remaining unused. If the inside core of the stator were not cut away, this would result in a considerable increase in the weight of the motor, which is equally undesirable.

In the prior art, stator arrangements have been developed that comprise a multi-part stator body. Stator bodies are known in which each stator tooth forms an individual component and the stator teeth are either directly connected to one another or connected via a separate ring. The individual stator teeth are inserted one inside the other in the way of tongue and groove joints, for example, and kept together by an interference fit. It is also known to slide individual stator teeth onto a stator back yoke ring. Examples of these kinds of multi-part stators can be found in U.S. Pat. No. 6,359,335; WO 02/47238; U.S. Pat. No. 5,786,651; DE 198 42 948; EP 0 915 553; U.S. Pat. No. 6,049,153; U.S. Pat. No. 5,796,195; EP 1 014 536; WO 02/47240; U.S. Pat. No. 6,555,942 and DE 101 43 870. In these kinds of multi-part stators, each stator tooth, or pole shoe respectively, can be wound separately and subsequently connected to the other stator teeth. The advantage of a multi-part stator body is that the individual parts can be produced with less waste. Particularly when each section includes a pole shoe, each pole shoe can be so configured that it receives a prefabricated coil. When the coils have been mounted onto the respective pole shoes, the stator sections are connected to each other and so arranged that, together with a stator back yoke ring, they form the complete stator. The greater proportion of the above-mentioned documents relate to inner rotor motors.

Applying phase windings to multi-part stator arrangements is easier than winding conventional single-part stator arrangements for outer or inner rotor motors. Although the prefabricated coils have to be mounted and connected in an extra production step, winding the stators is nevertheless made easier and quicker as a whole thanks to the possibility of using prefabricated coils. The use of thick coil wires in combination with thin pole gaps is made particularly easy using multi-part stator arrangements.

The problem arising in the manufacture of multi-part stator arrangements is that the individual stator teeth have to be connected together and held together in an appropriate way. This has generally been solved in the prior art by mounting the stator teeth onto a continuous stator ring. In other known embodiments, the stator teeth are coupled to each other using tongue and groove joints or similar means.

It is an object of the invention to provide a stator arrangement for an electric machine, particularly an outer rotor motor, that has a simple construction, that is manufactured with little waste and which can be wound and assembled with out any problems.

SUMMARY OF THE INVENTION

The invention provides a stator arrangement for an electric machine having a stator ring that is closed at its inside circumference and has stator poles on its outside circumference. The stator ring is built up of a plurality of substantially identical T-shaped segments, each T-shaped segment comprising a main leg having a head and a base and two arms protruding sideways from the head of the main leg. Within the stator ring, the main legs of the T-shaped segments are aligned in a radial direction with the T-shaped segments being arranged adjacent to each other with alternating orientation of the head and base of the main legs such that they complement one another to form the stator ring. The invention makes it possible for a stator for an outer rotor motor to be built up from a plurality of identical components that can be die-cut from sheet metal with minimum waste. The basic element of the stator arrangement is T-shaped. The "Ts" are arranged with alternating orientation such that the arms of every second T come to lie on the inner circle of the stator arrangement, where, together with the bases of the other Ts, they form a closed back yoke, and that the arms of each of the other "Ts" come to lie at the outer circle of the stator arrangement where they form stator poles. Building up the stator arrangement from a plurality of identical segments makes it possible to reduce the waste considerably during the manufacture of the stator laminations and thus to reduce the costs as well.

The stator arrangement according to the invention is further suitable for manufacturing stators having different numbers of poles and diameters using the substantially identical T-shaped segments. To change the number of poles or the diameter of the stator arrangement, more or fewer T-shaped segments need simply be joined to form a stator ring, the contact surfaces of the arms and bases of the T-shaped segments preferably being adjusted to the respective radius of curvature of the stator arrangement.

The design and construction according to the invention also makes it very simple to mount coil windings onto the stator poles. A winding can be easily mounted onto a separate T-shaped segment, the coil either being wound directly onto the T-shaped segment or a prefabricated coil being slid onto the segment. The T-shaped segments are subsequently joined together to form a stator ring, the radially outer arms of the T-shaped segments forming pole shoes. Phase windings are preferably only applied to these segments.

It is also expedient if the phase windings are wired up via a stator carrier only after the T-shaped segments have been connected.

Alongside its flexible construction, the stator arrangement according to the invention has the advantage that the individual ring segments can be produced with less waste than can a stator constructed as one-piece and also with less waste than the well-known stator arrangements having a back yoke ring and individual stator teeth mounted on the back yoke ring. The ring segments can further be die-cut from stator laminations in such a way that they all have the same preferred magnetic direction thus improving the magnetic properties of the electric machine.

In a preferred embodiment of the invention, the stator ring is held together at its inside circumference by the combination of a clamping sleeve and a clamping ring. The clamping sleeve is inserted from one end face of the stator arrangement into the central aperture and lies against the inside circumference of the stator ring. The clamping ring is guided onto the clamping sleeve from the opposite end face in order to hold these two parts together. The clamping sleeve and/or clamping ring preferably have positioning means that interact with the T-shaped segments in order to position and fix the clamping sleeve and the clamping ring with respect to the stator ring. For example, provision can be made for positioning nubs to be formed on the surfaces of the clamping sleeve and/or the clamping ring facing the stator arrangement, the positioning nubs engaging in corresponding recesses in the T-shaped segments.

In addition, the stator ring can be held together at its outside circumference by means of at least one locking ring or an adapter sleeve. Since, in the completely assembled electric machine, the locking ring or the adapter sleeve comes to lie in the air gap between the stator and the rotor, it should be as thin as possible and made of a material that has poor ferromagnetic conductivity.

The invention also provides a method of manufacturing a stator arrangement of the kind described above. According to the invention, a phase winding is mounted on every second T-shaped segment before the T-shaped segments are arranged adjacent to each other with alternating orientation of the head and the base of the main leg. In the case of the T-shaped segments that carry the phase windings, the head of the main leg is oriented radially outwards and in the case of the other T-shaped segments, the head of the main leg is oriented radially inwards. This goes to ensure that the wound T-shaped segments take the form of stator teeth with pole shoes. Between each two wound stator teeth there is a T-shaped segment whose free end does not widen like a pole shoe and which is disposed between windings having different phases.

The T-shaped segments can be connected together permanently by mechanical connecting means or, for example, by bonding, press fitting or welding.

SHORT DESCRIPTION OF THE DRAWINGS

Figure 1B:
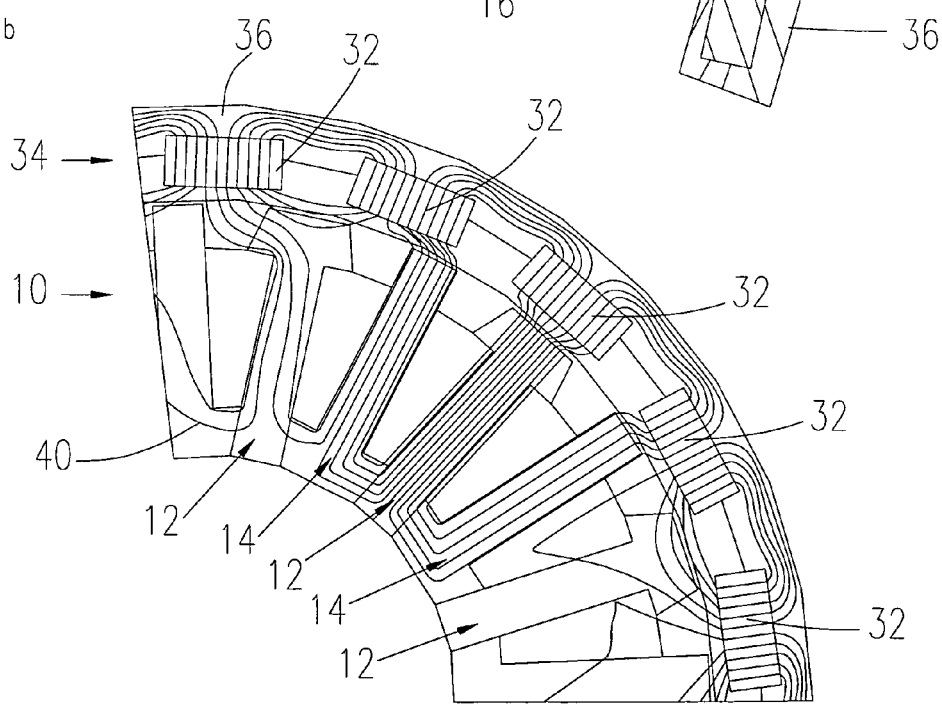
Figure 2:
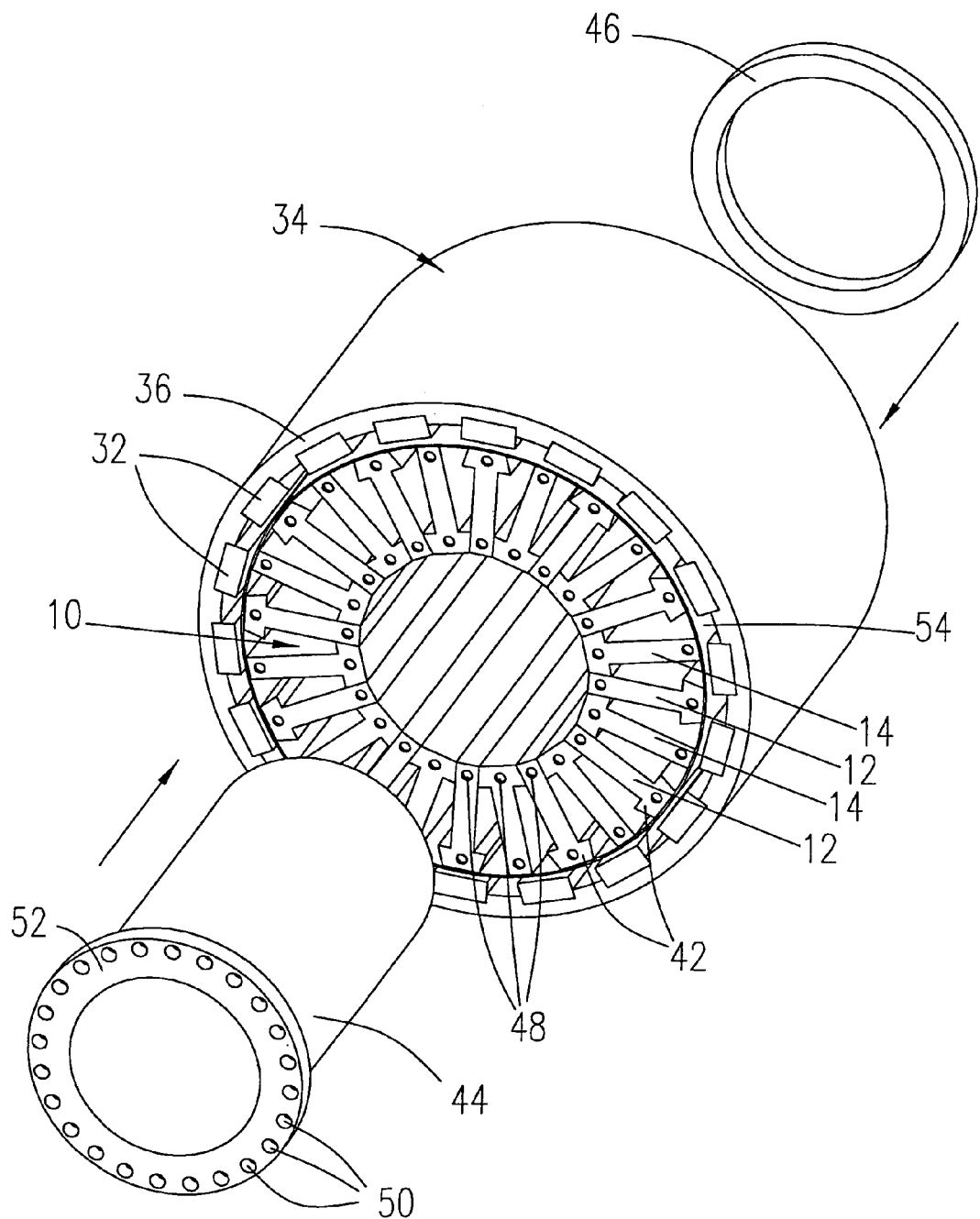

The invention is described in more detail below on the basis of a preferred embodiment with reference to the drawings. The figures show:

FIG. 1a a schematic view of a 60° sector of an electric machine according to the invention and FIG. 1b a similar view as in FIG. 1a, wherein magnetic flux lines are marked in, and FIG. 2 a schematic, perspective exploded view of an electric machine according to the invention.

DESCRIPTION OF PREFERRED EMBODIMENTS

FIG. 1a shows a schematic view from above of a sector of a stator arrangement for an electric machine having 36 slots in conjunction with 30 magnetic poles. The stator arrangement, which is indicated as a whole by 10, comprises a plurality of T-shaped segments 12, 14, the number of T-shaped segments 12, 14 corresponding to the number of slots of the electric machine. The T-shaped segments 12, 14 are at least approximately, but preferably completely, geometrically identical. Each T-shaped element comprises a main leg 16 having a base 18 and a head 20. Two arms 22, 24 protrude sideways from the head 20. The angle between the main leg 16 and the arms 22, 24 is preferably, but not necessarily, 90°. The main legs 16 of the T-shaped segments 12, 14 are aligned in a radial direction and between themselves define the slots 26 of the stator arrangement 10. The T-shaped segments 12, 14 are arranged adjacent to each other with alternating orientation of the head 20 and base 18 of the main leg, such that the arms of every second T-shaped segment 12 comes to lie on the outside circumference of the stator arrangement 10 and the arms of the T-shaped segments 14 located in between coming to lie on the inside circumference of the stator arrangement 10. The arms of the T-shaped segments 14 together with the bases 18 of the T-shaped segments 12 form a closed ring that encloses the inside circumference of the stator arrangement 10. Phase windings 28, 30 are mounted on the main leg 16 of those T-shaped elements 12 whose arms 22, 24 are located in a radially outwards direction. The associated radially outer arms 22, 24 form pole shoes that absorb magnetic flux from the rotor magnets 32.

The stator arrangement 10 is inserted coaxially into a rotor arrangement 34 that has a rotor back yoke 36 and rotor magnets 32 connected to the back yoke. The rotor magnets 32 can be embedded in a rotor body 38 or mounted on the inside circumference of the rotor body.

In FIG. 1a, the direction of magnetization of the rotor magnets is indicated by arrows, the direction of flow of the current of the phase windings 28, 30 is indicated by and .

FIG. 1b shows a similar view as in FIG. 1a, the flow of the magnetic flux lines 40 being marked in. Corresponding parts are indicated by the same reference numbers and not described again.

FIG. 2 shows a schematic, perspective exploded view of an exemplary embodiment of the stator arrangement according to the invention. Parts corresponding to those in FIG. 1a are indicated by the same reference numbers and are not described in detail again. As described in reference to FIG. 1a, the stator arrangement comprises a plurality of T-shaped segments 12 14 that are joined together to form a stator ring with alternating orientation. The stator ring is enclosed by the rotor arrangement 34 which comprises the rotor back yoke 36 and the rotor magnets 32. The phase windings are not illustrated in FIG. 2. It can be seen from the figure, however, that these windings can be easily mounted onto separate T-shaped segments 12, the arms of these segments 12 forming pole shoes 42 in order to receive the largest possible proportion of magnetic flux. The phase windings can either be wound onto the segments 12 or finished coils can be slid onto the segments, in conjunction with a coil carrier where applicable. It is expedient if, after the stator arrangement has been assembled, the windings are wired up via a separate stator carrier (not illustrated) that is disposed at an end face of the stator ring 10.

The stator arrangement can be fabricated as follows. The T-shaped segments are joined together with the aid of a positioning tool as shown in FIG. 2. Here, the T-shaped segments 12 whose arms lie radially outwards carry phase windings according to a desired winding pattern. The positioning tool can take the form, for example, of a hollow cylinder which is adjusted to the inside circumference and the outside circumference of the stator ring 10. In the illustrated embodiment of the stator arrangement, a clamping sleeve 44 is inserted into the inner circle of the prepositioned stator ring 10, the clamping sleeve fitting against the inside circumference of the stator ring 10. At the opposite end face of the stator ring 10, the clamping sleeve 44 can be connected to a clamping ring 46 so that the stator ring 10 is positioned and firmly clamped between these two parts.

The individual T-shaped segments 12, 14 are preferably built up as a stack of laminations that have fixing points 48 to connect the stator laminations. However, it is conceivable for the T-shaped segments to be pressed from an appropriate metallic powder. The fixing points 48 can interact with corresponding positioning nubs 50 that are formed on a shoulder 52 of the clamping sleeve 44 in order to position and fix the clamping sleeve 44 with respect to the stator ring 10.

The clamping ring 46 can be fixedly connected to the clamping sleeve 44, for example, by screwing, laser welding, bonding, press fitting or any similar way. It is also possible for the clamping ring to have positioning nubs.

In addition to or as an alternative to the clamping sleeve, an adapter sleeve 54 or one or more locking rings can be placed about the outside circumference of the stator arrangement 10 in order to give the stator arrangement additional support. Since the adapter sleeve 54 comes to lie in the air gap between the stator arrangement 10 and the rotor arrangement 34, it should be made as thin as possible from a material that has poor ferromagnetic conductivity.

The features revealed in the above description, the claims and the figures can be important for the realization of the invention in its various embodiments both individually and in any combination whatsoever.

IDENTIFICATION REFERENCE LIST

10 Stator arrangement, stator ring
12, 14 T-shaped segments
16 Main leg
18 Base of the main leg
20 Head of the main leg
22. 24 Arms
26 Slots
28, 30 Phase windings
32 Rotor magnets
34 Rotor arrangement
36 Rotor back yoke
38 Rotor body
40 Flux lines
42 Pole shoes
44 Clamping sleeve
46 Clamping ring
48 Fixing points
50 Positioning means
52 Shoulder of the clamping sleeve
54 Adapter sleeve

The invention claimed is:

1. A stator arrangement for an electric machine having a stator ring (10) that is closed at its inside circumference and has stator poles at its outside circumference, wherein the stator ring (10) is built up of a plurality of substantially identical T-shaped segments (12, 14) and wherein each of the T-shaped segments (12, 14) has a main leg (16) having a head (20) and a base (18) and two arms (22, 24) protruding sideways from the head of the main leg, the main legs (16) of the T-shaped segments (12, 14) are aligned in a radial direction and the T-shaped segments (12, 14) are arranged adjacent to each other with alternating orientation of the head (20) and base (18) of the main leg such that they complement one another to form the stator ring (10).

2. A stator arrangement according to claim 1, wherein at the inside circumference of the stator arrangement, the arms (22, 24) and the bases (18) of the main legs (16) complement adjoining T-shaped segments (12, 14) to form a closed ring.

3. A stator arrangement according to claim 1, wherein the radially outer arms (22, 24) of the T-shaped segments (12) form pole shoes.

4. A stator arrangement according to claim 3, wherein phase windings (28, 30) are applied to the main legs (16) of the T-shaped segments (12) whose arms (22, 24) are located radially outwards.

5. A stator arrangement according to claim 4, wherein the phase windings (28, 30) are connected to each other via a stator carrier that is disposed at one end face of the stator ring (10).

6. A stator arrangement according to claim 1, wherein the stator ring (10) is held together at its inside circumference by the combination of a clamping sleeve (44) and a clamping ring (46).

7. A stator arrangement according to claim 6, wherein the clamping sleeve (44) and/or the clamping ring (46) have positioning means (50) that interact with the T-shaped segments (12, 14) in order to position and fix the clamping sleeve (44) and the clamping ring (46) with respect to the stator ring (10).

8. A stator arrangement according to claim 7, wherein the positioning means comprise nubs (50) that engage into corresponding recesses (48) in the T-shaped segments (12, 14).

9. A stator arrangement according to claim 1, wherein the stator ring (10) is held together at its outside circumference by at least one locking ring or an adapter sleeve (54).

10. A method for the manufacture of a stator arrangement according to one of the preceding claims wherein a phase winding (28, 30) is applied to every second (12) T-shaped segment (12, 14), the T-shaped segments (12, 14) are arranged adjacent to each other with alternating orientation of the head and base of the main leg in such a way that in the case of the T-shaped segments (12) that carry the phase windings (28, 30), the head of the main leg is oriented radially outwards and in the case of the other T-shaped segments (14) the head of the main leg is oriented radially inwards.

11. A method according to claim 10, wherein the T-shaped segments (12, 14) are connected permanently to one another.

* * * * *

UNITED STATES PATENT AND TRADEMARK OFFICE
CERTIFICATE OF CORRECTION

PATENT NO. : 7,067,953 B1 Page 1 of 1
APPLICATION NO. : 11/302141
DATED : June 27, 2006
INVENTOR(S) : Helmut Hans It is certified that error appears in the above-identified patent and that said Letters Patent is hereby corrected as shown below:

On the title page (74), delete "Duanune Morris LLP" and insert therefor
--Duane Morris LLP--.

Signed and Sealed this

Seventh Day of November, 2006

JON W. DUDAS
*Director of the United States Patent and Trademark Office*